(12) United States Patent
Pfitzmann et al.

(10) Patent No.: US 12,254,033 B2
(45) Date of Patent: Mar. 18, 2025

(54) SEARCH IN KNOWLEDGE GRAPHS

(71) Applicant: International Business Machines Corporation, Armonk, NY (US)

(72) Inventors: Birgit Monika Pfitzmann, Wettswil (CH); Kasper Dinkla, Adliswil (CH); Michele Dolfi, Zurich (CH); Christoph Auer, Zürich (CH); Peter Willem Jan Staar, Zurich (CH); André Carvalho, Tomar (PT)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 17/199,509

(22) Filed: Mar. 12, 2021

(65) Prior Publication Data

US 2022/0292121 A1   Sep. 15, 2022

(51) Int. Cl.
    G06F 16/33     (2019.01)
    G06F 16/334    (2025.01)
    G06F 16/901    (2019.01)
    G06F 40/103    (2020.01)
    G06F 40/295    (2020.01)
    G06F 40/30     (2020.01)
    (Continued)

(52) U.S. Cl.
    CPC ...... *G06F 16/3344* (2019.01); *G06F 16/9027* (2019.01); *G06F 40/103* (2020.01); *G06F 40/295* (2020.01); *G06F 40/30* (2020.01); *G06N 5/02* (2013.01); *G06N 20/00* (2019.01)

(58) Field of Classification Search
    None
    See application file for complete search history.

(56) References Cited

U.S. PATENT DOCUMENTS 9,576,007 B1 * 2/2017 Sivathanu ........... G06F 16/2228
10,296,524 B1   5/2019 Tung et al.
(Continued)

FOREIGN PATENT DOCUMENTS

CN         111190966 A      5/2020
WO    WO-2021195149 A1 *   9/2021   ......... G06F 16/2237

OTHER PUBLICATIONS

Matteo Lissandrini, Davide Mottin, Themis Palpanas, Yannis Velegrakis; Multi-Example Search in Rich Information Graphs; Apr. 19, 2018 URL: https://ieeexplore.ieee.org/document/8509299 (Year: 2018).*

(Continued)

*Primary Examiner* — Richa Sonifrank
(74) *Attorney, Agent, or Firm* — Jeffrey Ingalls

(57) ABSTRACT

The present disclosure relates to a method for searching a graph representing content of digital objects. A set of operations for traversing the graph may be determined according to a search request. The set of operations may be executed, resulting in intermediate result vectors of nodes and a result vector of nodes, wherein the result vector of nodes is associated with a result set of one or more object units of the digital objects. Intermediate result vectors may be selected from of the intermediate result vectors. A set of result entities may be identified. The set of result entities are entities which are part of the object units and part of entities represented by nodes of said selected intermediate result vectors. The set of result entities and the result set of object units may be provided as a result of the search request.

16 Claims, 10 Drawing Sheets

(51) Int. Cl.
*G06N 5/02* (2023.01)
*G06N 20/00* (2019.01)

(56) References Cited

U.S. PATENT DOCUMENTS

| | | | | |
|---|---|---|---|---|
| 2021/0271711 | A1* | 9/2021 | Schlegel | G06F 16/9014 |
| 2021/0326531 | A1* | 10/2021 | Kumar | G06F 40/279 |
| 2022/0067273 | A1* | 3/2022 | Shin | G06F 16/9024 |
| 2023/0028983 | A1* | 1/2023 | Oechsle | G06F 16/904 |

OTHER PUBLICATIONS

Iztok Savnik, Mikita Akulich, Matjaz Krncl, Riste S krekovski; Data structure set-trie for storing and querying sets: Theoretical and empirical analysis; Feb. 10, 2021 URL: https://www.ncbi.nlm.nih.gov/pmc/articles/PMC7875400/ (Year: 2021).*

De Donato et al., "QueDI: From Knowledge Graph Querying to Data Visualization", SEMANTiCS 2020, LNCS 12378, pp. 70-86, 2020.

Yahya et al., "Exploratory Querying of Extended Knowledge Graphs", Proceedings of the VLDB Endowment, vol. 9, No. 13, Copyright 2016 VLDB Endowment 21508097/16/09, Published Date: Sep. 2016, 4 pages.

Song et al., "Building and Querying an Enterprise Knowledge Graph", IEEE Transactions on Services Computing, Published Date: Jun. 13, 2017, 14 pages.

Chai et al., "Querying Enterprise Knowledge Graph With Natural Language", Copyright 2019 for this paper by its authors, Use permitted under Creative Commons License Attribution 4.0 International, printed Feb. 26, 2021, 2 pages.

Gómez-Romero et al, "Visualizing large knowledge graphs: A performance analysis", Future Generation Computer Systems, Available online Jun. 30, 2018, Science Direct, 15 pages. https://www.sciencedirect.com/science/article/pii/S0167739X17323610.

"Graph Visualization Tools", neo4j developer, printed Feb. 26, 2021, 13 pages. https://neo4j.com/developer/tools-graph-visualization/.

Xu et al., "LogCanvas: Visualizing Search History Using Knowledge Graphs", SIGIR '18, Jul. 8-12, 2018, Ann Arbor, MI, USA, arXiv:1808.05127v1, 4 pages. https://arxiv.org/pdf/1808.05127.pdf.

Starr, "How To Use Entity Markup To Appear In The Knowledge Graph", SEO, Mar. 21, 2014, 16 pages. https://searchengineland.com/5-ways-optimize-markup-knowledge-graph-semantic-search-186755.

Mell et al., "The NIST Definition of Cloud Computing", Recommendations of the National Institute of Standards and Technology, Special Publication 800-145, Sep. 2011, 7 pages.

* cited by examiner

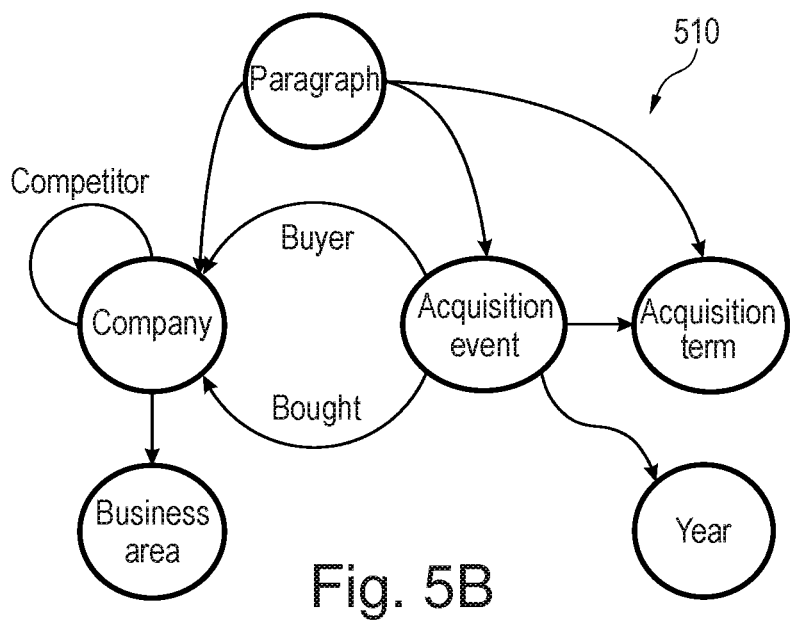

Fig. 5B

In 2018, ABC acquired CompanyY, an Australian-based storage company reputedly for US$200M. Other key takeovers in 2018 were CompanyX's acquisition of CompanyZ, and Y-Bank's purchase of Zbank. The tape market consolidated when TaperA bought MagneticB.

Fig. 5C

```
"entities" : {
   ...
   "Company" : [
    {
       "entity_id" : "12345abc"
       "_synonyms" : [
         "ABC"
       ],
       "match" : 'ABC Inc.",
       "original" : "ABC",
       "prov" : "text",
       "range" : [
         9,
         12
       ],
       "type" : "Company"
    },
    ...
   ],
   ...},
```

Fig. 5D

```
"entities" : {
  ...
  "Company" : [
    {
      "entity_id" : "12345abc"
      "_synonyms" : [
        "ABC"
      ],
      "match" : 'ABC Inc.",
      "original" : "ABC",
      "prov" : "text",
      "range" : [
        9,
        12
      ],
      "type" : "Company"
    },
    ...
  ],
  ...},
```

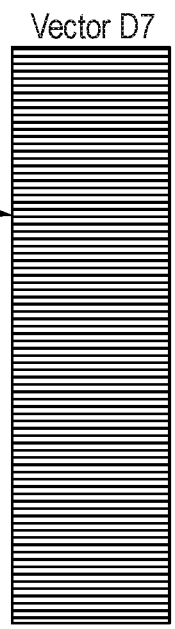

Fig. 5F

In 2018, ABC acquired CompanyY, an Australian-based storage company reputedly for US$200M.

Other key takeovers in 2018 were CompanyX's acquisition of CompanyZ, and Y-Bank's purchase of Zbank. The tape market consolidated when TaperA bought MagneticB.

Fig. 5G

SEARCH IN KNOWLEDGE GRAPHS

BACKGROUND

The present disclosure relates to the field of digital computer systems, and more specifically, to a method for searching a graph representing content of digital objects.

Knowledge graphs (KGs) from large document collections are an important research strategy, e.g., for the oil and gas industry, or for Covid-19 literature. The KG may be assembled or built using natural-language processing (NLP). The NLP enables to identify entities and relationships. Results are stored as graph nodes, with edges to their sources.

SUMMARY

In certain embodiments, a computer-implemented method is provided for searching a graph representing content of digital objects, the graph comprising nodes representing entities and edges representing relationships between the entities, the entities being descriptive of the content of the digital objects. The method comprises: receiving a search request; determining a set of operations for traversing the graph according to the search request, wherein each operation of the set of operations receives an input and provides, as output, a vector of nodes; executing the set of operations, resulting in intermediate result vectors of nodes and a result vector of nodes, the result vector of nodes being associated with a result set of one or more object units of the digital objects; retrieving at least part of the result set of object units of the digital objects; selecting intermediate result vectors of the intermediate result vectors; identifying a set of result entities as entities which are part of the retrieved object units and part of entities represented by nodes of said selected intermediate result vectors; providing the set of result entities of the result set of object units and the result set of object units as a result of the search request.

In certain embodiments, a computer program product is provided comprising a computer-readable storage medium having computer-readable program code embodied therewith, the computer-readable program code configured to implement all of the steps of the method according to preceding embodiments.

In certain embodiments, a computer system is provided for searching a graph representing content of digital objects, the graph comprising nodes representing entities and edges representing relationships between the entities, the entities being descriptive of the content of the digital objects. The computer system is configured for: receiving a search request; determining a set of operations for traversing the graph according to the search request, wherein each operation of the set of operations receives an input and provides, as output, a vector of nodes; executing the set of operations, resulting in intermediate result vectors of nodes and a result vector of nodes, the result vector of nodes being associated with a result set of one or more object units of the digital objects; retrieving at least part of the result set of object units of the digital objects; selecting intermediate result vectors of the intermediate result vectors; identifying a set of result entities as entities which are part of the retrieved object units and part of entities represented by nodes of said selected intermediate result vectors; providing the set of result entities of the result set of object units and the result set of object units as a result of the search request.

These and other features and advantages will become apparent from the following detailed description of illustrative embodiments thereof, which is to be read in connection with the accompanying drawings.

It should be noted that the exemplary embodiments are described with reference to different subject-matters. In particular, some embodiments are described with reference to method type claims whereas other embodiments may be described with reference to apparatus, system, or computer program product type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus, system or computer program product type claims, is considered as to be described within this document.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 5B depicts a portion of a graph representation of an ontology in accordance with certain embodiments.

FIG. 5C depicts an example object unit in accordance with certain embodiments.

FIG. 5D depicts an example file for storing entities and their identifiers in accordance with certain embodiments.

FIG. 5F illustrates a matching operation between entities of object units and entities of result vectors in accordance with certain embodiments.

FIG. 5G depicts an example presentation of object units in accordance with certain embodiments.

DETAILED DESCRIPTION

Figure 1:
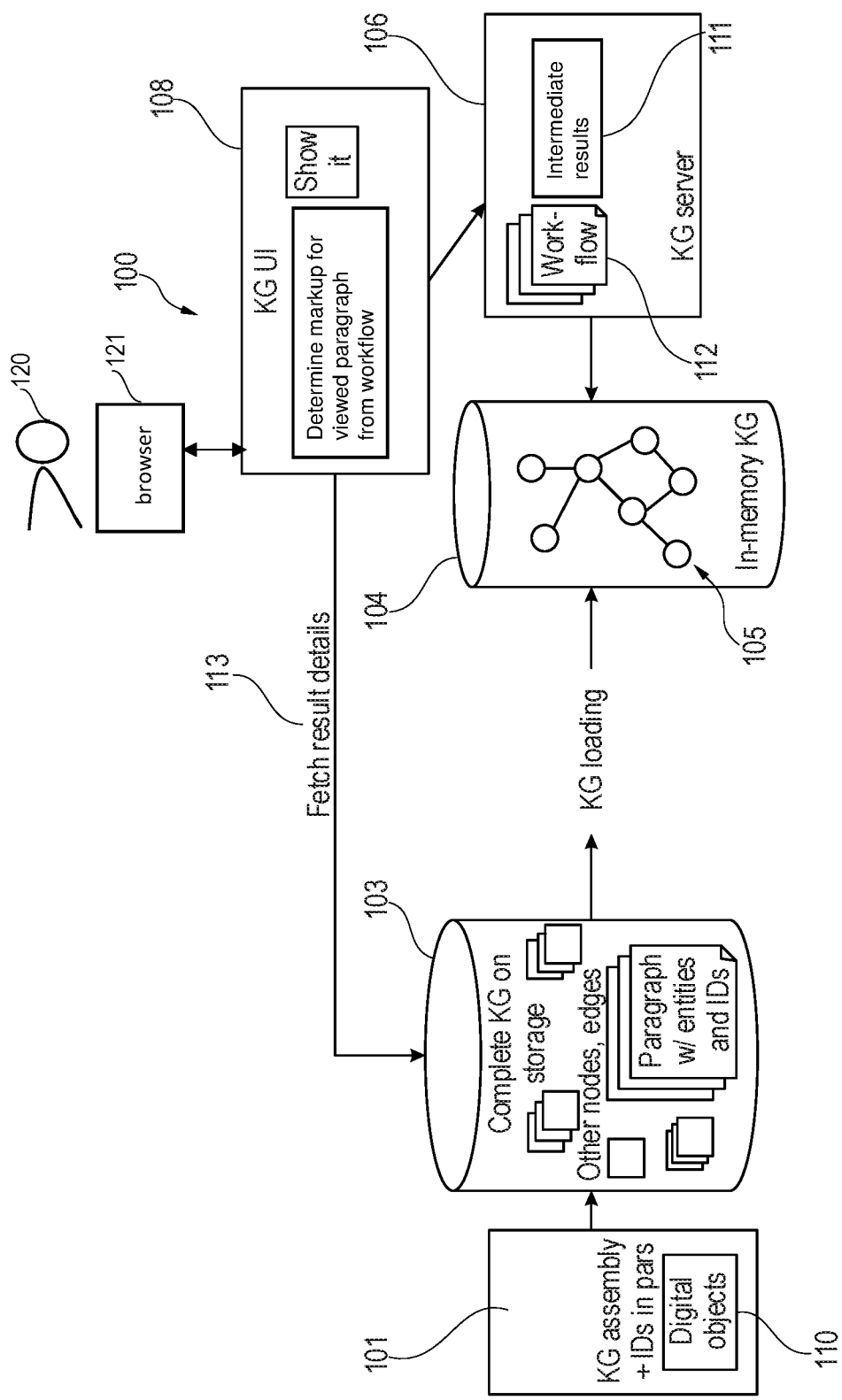
FIG. 1 is a block diagram of an information retrieval system in accordance with certain embodiments.

A The descriptions of the various embodiments are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Computer data storage is one of the core functions of a general-purpose computer. It enables the recording of information of digital objects. The digital object may include text, still images, audio, video, electronic documents, or other digital media formats. The digital objects may be advantageous as they can, for example, be stored in much less space than paper documents. The digital object may comprise object units. An object unit may be a portion of the digital object. For example, in case the digital object is an electronic document, the object unit may be a document unit such as a paragraph, chapter etc. In case the digital object is an image, the object unit may be a portion of the image. In case the digital object is a video, the object unit may be a frame of the video or a sequence of frames of the video.

In addition to storing digital objects, storage systems allow for searching and retrieving of the content contained in the digital objects. Although the notion of retrieving a particular object or part of an object may be simple, retrieval in the electronic context can be quite complex and powerful. This may particularly be challenging as the size of stored digital objects may be very high. For that, graphs may advantageously be used according to the present subject matter to enable an efficient access to the digital objects. The graph may represent content of the digital objects. The graph comprises nodes that represent entities and edges that represent relationships between the entities. The entities are descriptive of the content of the digital objects. The graph may be built or assembled by identifying entities and their relationships in the stored digital objects. The entity may be a real-world object, such as persons, locations, organizations, products, an object unit etc., that can be denoted with a proper name. The entity can be abstract or have a physical existence. Entities may be viewed as entity instances (e.g., New York City is an instance of a city). The entities may, for example, be determined according to an annotation method. The annotation method may, for example, process a digital object in order to identify entities present in the digital object. The annotation method may locate and classify entities mentioned in the digital object into predefined categories such as person names, organizations, locations, medical codes, time expressions, quantities, monetary values, percentages, etc. Distinct entities may be assigned unique identifiers respectively. In case of electronic documents, the annotation method may, for example, use a natural language processing (NLP) technique for the identification of the entities and their relationships. In case of images, the annotation method may use an image analysis to identify certain entities and store their name and position in the image (e.g., the position may be defined like a bounding box in millimeters relative to lower left image, or even a more complex contour), similar to how the NLP identifies entities by name and span (like "from character 42 to 46"). Then if it has been decided that an entity should be marked in this image, a marking procedure may be applied to this name and position. For example, a colored rectangle along the bounding box may be drawn and the colors may be explained, or the name could be next to the bounding box. The graph may further comprise extra nodes which represent extra data. The extra nodes may, for example, be obtained from a data catalogue.

The built graph may refer to a property graph where data values are stored as properties on nodes and edges. Property graphs may be managed and processed by a graph database management system. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 toward node v2. A node of the graph may represent an entity. The entity may refer to a company, user etc. The entity (and the corresponding node) may have one or more entity attributes or properties which may be assigned values. For example, the entity attributes of the user may comprise a user ID, location of the user etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g., parent and child) relationship and/or associative relationship in accordance with a certain hierarchy. For example, the inheritance relationship between nodes v1 and v2 may be referred to as a "is-a relationship" between v1 and v2 e.g., "v2 is-a parent of v1". The associative relationship between nodes v1 and v2 may be referred to as a "has-a relationship" between v1 and v2 e.g., "v2 has a has-a relationship with v1" means that v1 is part or is a composition of or associated with v2.

The present subject matter may represent the graph in a format that enables an efficient access to the content of the digital objects. The graph may be represented in the computer in different ways. For example, the graph may be represented by an adjacency matrix. For example, in the adjacency matrix format, the graph-traversals can be directly translated into matrix vector multiplication operations. This may enable that most graph operations can be translated into matrix-operations using linear algebra.

Once built and stored, the present subject matter may use the graph to allow a user to specify search terms and return one or more object units which match the user's search terms. The term "user" may refer to an entity e.g., an individual, a computer, or an application executing on a computer that issues search requests. The returned object units may, for example, further indicate portions of the object units that are relevant for the search. This may particularly be advantageous as users expect that result mark-up relates to their queries—in particular business users who do not build query workflows themselves. The search results may be obtained by performing the set of operations on the graph. The set of operations may be operations of a workflow. The set of operations comprises an operation that provides the result of the search request; that operation may, thus, be named result operation. The set of operations may further comprise one or more operations that provide intermediate results; the one or more operations may thus be named intermediate operations. The intermediate results may be used to obtain the result of the search request. Each operation of the set of operations may receive one or more inputs and provide an output as a result of processing the inputs. The output may be a vector of nodes. The vector may, for example, comprise a number of elements that corresponds to the number of nodes in the graph. The elements of a given vector may be set to predefined values to indicate the nodes that belong to the given vector. For example, if a given node belongs to a vector, the vector element that is associated with the given node may have value 1, otherwise that vector element may have value 0. The output vector may be named result vector if it is output by the result operation. The output vector may be named intermediate result vector if it is output by an intermediate operation. The intermediate result vectors may be stored. The result vector may comprise nodes that represent object units such as paragraphs. Those object units may contain search results that the user is looking for. These object units may be named result object units. However, the result object units may contain much more content than what the user is searching for. The present subject matter may solve this issue by further providing the set of result entities that are of interest for the user. For example, in case the result object unit is a paragraph, the set of result entities may be highlighted in the paragraph before providing (e.g., displaying) the paragraph to the user. The set of result entities may be obtained by comparing the entities of the result object units and entities of selected intermediate result vectors. In one example, the selected intermediate result vectors may be selected a priori or posteriori. With the a priori approach, the intermediate result vectors may be selected before performing the set of operations. With the posterior approach, a backward processing of the intermediate search results and/or of the set of operations may be performed in order to select the intermediated result vectors that can be of interest for the user. Using different approaches may be advantageous as it may enable a flexible implementation of the present subject matter (e.g., different and refined selection techniques may be used). According to one embodiment, the method further comprises selecting the intermediate result vectors based on a selection criterion requiring any one of: a selection based on the type of operations that precedes or follows the result operation, a random selection of a subset of intermediate result vectors, a selection of intermediate result vectors of operations succeeding an initial operation of the set of operations, a selection of an intermediate result vector of an operation immediately preceding the operation that resulted in the result vector, and a user selection of intermediate result vectors. According to one embodiment, the selected intermediate result vectors are all intermediate result vectors.

The present embodiments may enable execution of advanced graph-analytics as well as evaluate deep queries with multi-hop traversals on large graphs (e.g., with more than 1B edges) extremely fast. The speed at which the data is generated and processed may meet the demands and challenges that lie in the path of growth and development. The present subject matter may provide accurate search results. The users may interpret results better, and thus take better decisions on them. Compared with plain searches, the graphs may offer much better performance, and a much wider range of possible query workflows.

According to certain embodiments, the graph is stored in a first storage device and the digital objects are stored in a second storage device, wherein the first storage device has higher data access performance than the second storage device. Data access performance may comprise speed of the data access and/or Input/Output operations per time interval and/or a latency for each of the read operations. For example, hard disk data access performance is low or much lower (e.g., slower) than the memory access. The first storage device comprises a memory such as RAM. The second storage device comprises disk-based storage such as hard disk. Storing the graph in memory may enable to traverse it with efficient vector arithmetic. Using the second storage device may be advantageous as larger data fields of nodes, e.g., the texts or PDF versions of underlying articles, may be stored on disks. They may only be retrieved when search results are viewed. Search queries can be workflows using graph structures. For example, they contain edge traversal, intersection, or union of results from different paths, etc. According to certain of the present embodiments, if one views results like paragraphs, not only general annotations from assembly time can be marked up (e.g., underlined in colors) but also specific results from the current search may be marked.

According to certain embodiments, the method further comprises associating each node of the graph with an identifier for identifying the entity represented by said each node, wherein the identifying of the set of result entities comprises: comparing the identifiers of entities of the object units with the identifiers of nodes of the selected intermediate result vectors; wherein the set of result entities are the matching entities. For example, the identifiers may be assigned to the nodes at the assembly time of the graph. That is, each identified entity that may be added as a node to the graph may be assigned a unique identifier. For example, if the entity "Company X" appears in 3 document units, one node representing "Company X" may be added to the graph and may have identity "12341234". Then in all 3 document units, the mention of "Company X" is associated with this same identity "12341234". The identifiers may be stored in the second storage device in association with the digital objects. For example, each digital object may be associated with a file such as a JSON file that contains the distinct entities identified in the digital object. Each entity in the file may be associated with its identifier. The identifier of an entity may also be provided as a property of the node that represents the entity in the graph. That is, the identifier of an entity may be stored in the second storage device and may be provided as part of the graph in the first storage device. The result set of object units may be retrieved in association with their associated files from the second storage device, where identifiers of each retrieved file may be compared with the identifiers in the nodes of the selected intermediate result vectors. This embodiment may provide searchable terms in paragraphs with identities during the graph assembly phase. This may enable to evaluate, when a result paragraph is viewed, which entities to mark in it, by referring back to the workflow and intermediate workflow execution results.

According to certain embodiments, the set of operations comprises at least two distinct subsets of operations comprising a first subset of intermediate operations and a second subset of intermediate operations, wherein the execution of the first and second subsets of intermediate operations result respectively in a first intermediate result vector and a second intermediate result vector. The first and second intermediate result vectors are associated respectively with a first set of object units and second set of object units of the digital objects. The result vector is a result of a combination of the first and second intermediate result vectors. The combination may, for example, be an intersection or union operation. The method further comprises: selecting intermediate result vectors of the first subset, identifying a first set of intermediate result entities as entities which are part of the retrieved object units and part of entities represented by nodes of said selected intermediate result vectors of the first intermediate result vector, selecting intermediate result vectors of the second subset, identifying a second set of intermediate result entities as entities which are part of the retrieved object units and part of entities represented by nodes of said selected intermediate result vectors of the second subset, wherein the set of result entities is a combination of the two sets of intermediate result entities.

According to certain embodiments, the method of the last embodiment is performed in response to determining that the first and second sets of documents units comprise the result set of object units.

According to certain embodiments, the result vector is a result of an operation on one intermediate result vector associated with respective set of object units of the digital objects. The method further comprises: selecting intermediate result vectors that precede the one intermediate result vector, identifying a set of intermediate result entities as entities which are part of the retrieved object units and part of entities represented by nodes of said selected intermediate result vectors, wherein the set of result entities is the set of intermediate result entities.

According to certain embodiments, the result vector comprises nodes representing the result set of object units.

According to certain embodiments, the method further comprises upon receiving the search request, selecting one of predefined search workflows, wherein the determined set of operations are operations of the selected search workflow.

According to certain embodiments, the set of operations comprises a node retrieval operation and at least one traversal operation, wherein the node retrieval operation receives the search request as input and provides an initial vector of nodes that fulfils the search request, wherein the traversal operation provides a result vector of nodes that fulfil a traversal condition and are reachable after one step traversal starting from an input vector, wherein the input vector is the initial vector of nodes in case the node retrieval operation is the operation immediately preceding the traversal operation, otherwise the input vector is an intermediate result vector of another immediately preceding operation.

According to certain embodiments, the set of operations further comprises logical operations and transformation operations.

According to certain embodiments, providing the set of result entities and the one or more object units comprises displaying the units and highlighting the set of result entities.

According to certain embodiments, the object unit is any one of: a paragraph, section, chapter, a sequence of video frames, an image portion.

According to certain embodiments, the entity is a word or combination of words of a digital object, or an object such as a person or car identified in an image or video.

FIG. 1 is a block diagram of an information retrieval system 100 in accordance with certain embodiments. The information retrieval system 100 may comprise a graph assembly system 101 and a server 106. The information retrieval system 100 may further comprise a first storage device 104 and a second storage device 103. The first storage device 104 may, for example, be a memory device. The second storage device may be a persistent storage device. The graph assembly system 101 may be configured to assemble or build a graph 105 that represents content of digital objects 110 such as electronic documents and/or videos and/or images. The graph 105 may be a knowledge graph (KG). The graph 105 may be stored in the second storage device 103 in association with object units and identifiers of the entities of the object units e.g., paragraphs. As indicated in FIG. 1, the graph 105 may be loaded into the first storage device 104 for enabling an efficient search in the graph 105. The graph 105 may thus be provided as an in-memory graph. The server 106 may be configured to perform searches in the in-memory graph 105 according to workflows 112. Each of the workflows 112 may comprise a set of operations whose intermediate results 111 are stored by the server 106. Alternatively, or additionally, the intermediate results 111 may advantageously be stored in the first storage device 104. The result of a workflow may be a set of nodes of the graph 105, wherein each node of the set of nodes may represent an object unit e.g., paragraph, that is stored in the second storage device 103. Thus, for providing the result of the search, details of the result may be fetched (113) from the second storage device 103. For example, object units represented by the set of nodes may be fetched. In addition, entities of the fetched object units may be marked. The marked entities may be determined according to the present embodiments. The result of the workflow 112 including the fetched object units may be displayed on a user interface 108. In addition, the displayed object units show the marked entities. The user interface 108 may be a user interface of the server 106 or may be an interface of another server (UI server) that is not part of the server 106. The server 106 may be configured to use the UI server to display the result of the search request. The UI server may enable a user 120 to access the content of the user interface 108 via a browser 121.

Figure 2:
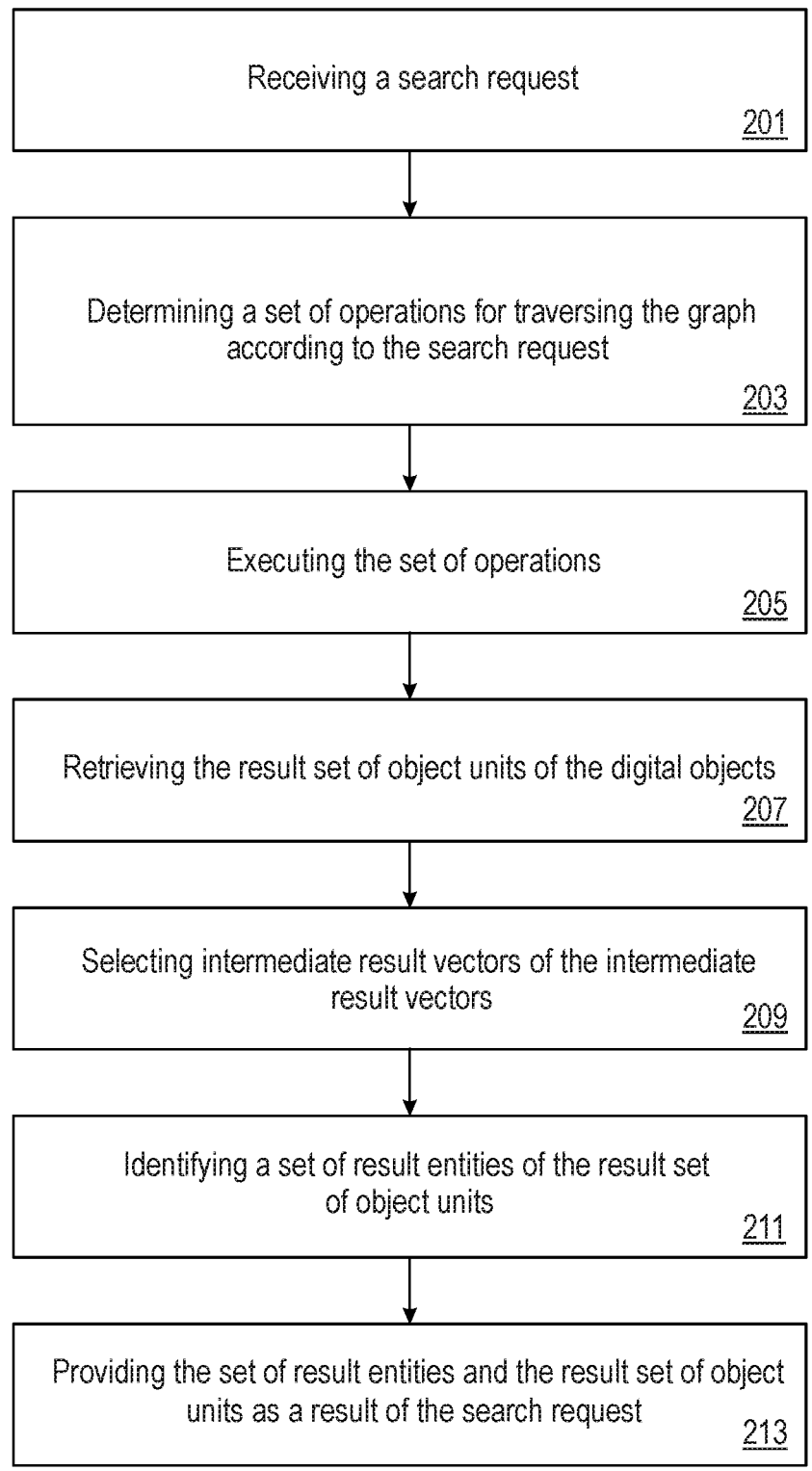
FIG. 2 is a flowchart of a method for searching a graph representing content of digital objects in accordance with certain embodiments.

FIG. 2 is a flowchart of a method for searching a graph representing content of digital objects in accordance with certain embodiments. For the purpose of explanation, the method described in FIG. 2 may be implemented in the information retrieval system 100 illustrated in FIG. 1, but it is not limited to this implementation. The method of FIG. 2 may, for example, be performed by the server 106. In another example, the method of FIG. 2 may be performed by the server 106 and the UI server.

A search request may be received in operation 201. The search request may be received from a user. The search request may, for example, be received via a user interface of the server 106. The search request may require the access to (e.g., by displaying) digital objects or object units that satisfy the search request. The search request may indicate the domain of interest of the user. The domain may represent concepts or categories which belong to a part of the world, such as biology or politics. The domain typically models domain-specific definitions of terms. For example, a domain can refer to healthcare, advertising, commerce, medical, chemical, physical, computer science, oil-and-gas, transportation, financial and/or biomedical-specific field. The domain of interest of the user may be one of the domains covered by the digital objects 110. Having a request that has one of the domains covered by the digital objects may be advantageous as it may enable to obtain accurate results of the search request.

In a first request example, the search request may comprise search terms of the user that would satisfy the information needs of the user. For example, the search request may comprise the search terms "vaccine for coronavirus." The server 106 may, for example, perform a lexical search by looking for literal matches of the search terms or variant of them. The server 106 may, in another example, perform a semantic search based on an understanding of the overall meaning of the search request.

In a second request example, graph queries may be defined in a declarative format named workflow. For that, the user may indicate an existing workflow by providing a workflow identifier or may build a new workflow. The existing workflows may, for example, be predefined based on customer requests. Following the above example, the workflow may be adapted to perform a search for the terms "vaccine for coronavirus." The workflow may, for example, be built by representing as a directed acyclic graph (DAG) of operations. The nodes of DAG may represent specific graph operations which mutate an input (or intermediate) set of nodes into another set. The user may, for example, be provided with different types of nodes (i.e., different types of operations) and different types of edges such that the user can build a DAG of operations that would satisfy the search request. This second query example may be advantageous as it may avoid imposing a complex query language onto the user. In one example, the workflow may further be configured to prompt the user for further inputs while the set of operations being executed. Those inputs may enable to refine the search.

A set of operations may be determined in operation 203 for traversing the graph according to the search request, wherein each operation of the set of operations receives an input and provides, as output, a vector of nodes. The input may, for example, be a vector of nodes or initial search terms of the user.

Following the first request example, the set of operations may, automatically, be determined by the server 106 based, for example, on the meaning of the search request. The server may, in another example, determine variants of the search terms and search for literal matches of the search terms and the variants. Following the second request example, the determined set of operations may be the operations of the workflow that is built by the user or the workflow that is selected by the user from the predefined workflows.

In one first workflow example, the set of operations may comprise one result operation. In this case, the set of operations $OP_1, OP_2 \ldots OP_N$, where $N \geq 2$ may be provided as one sequence of operations $OP_1, OP_2 \ldots OP_N$. The operation $OP_N$ may be the result operation or final operation of the sequence of operations. The other operations $OP_1$, $OP_2 \ldots OP_{N-1}$ may be intermediate operations. In a base case, N=2 because the set of operations may comprise an operation $OP_1$ for performing a search with user input (e.g., a regex search) followed by an operation $OP_2$ which may be an edge traversal to nodes that represent object units. In another example, the set of operations $OP_1, OP_2 \ldots OP_N$ may be provided as multiple subsets of operations whose results are provided as input to a final operation of the set of operations in order to obtain the final or overall result of the set of operations. For example, the set operations may comprise one sequence of operations $OP_1, OP_3 \ldots OP_{N-1}$ and another sequence of operations $OP_2, OP_4 \ldots OP_{N-2}$, wherein the result vectors of the operations $OP_{N-1}$ and $OP_{N-2}$ are provided as input to the result operation $OP_N$. For example, in case the user requests information about vaccine for coronavirus, the set of operations may comprise one sequence of operations that enable a search in a science domain represented by scientific papers e.g., the set operations may comprise one node retrieval operation $OP_1$ to obtain from the graph 105 first nodes that match the "coronavirus" search term, a filter operation $OP_2$ that filters the first nodes that are, for example, linked with an edge category "vaccines" to obtain second nodes that represent "vaccines" and a result operation $OP_3$ which is a traversal operation that traverses the graph (starting from the second nodes) to identify nodes that represent relevant paragraphs of the scientific papers.

In one second workflow example, the set of operations may comprise more than one result operation. For example, the set of operations may comprise multiple independent sequences of operations e.g., one sequence of N1 operations $OP_1^1, OP_2^1 \ldots OP_{N1}^1$, where $N1 \geq 2$ and another sequence of N2 operations $OP_1^2, OP_2^2 \ldots OP_{N2}^2$, $N2 \geq 2$. This may, for example, enable to perform alternative searches for the same search terms. In another example, the two sequences of operations may have one or more common operations. For example, in case the user requests information about "vaccine for coronavirus," the set of operations may comprise two sequences of operations, wherein the first sequence of operations may enable a search of "vaccines" associated with "coronavirus" in the graph and the second sequence of operations may enable to search for another variant such as "prevention methods for coronavirus." In this case, the first operation of the two sequences may be the same node retrieval operation that would obtain all nodes related to "coronavirus," and the remaining operations may be different e.g., the second operation of the first sequence may be a filter operation for filtering nodes that represent "vaccines" while the second operation of the second sequence may be a filter operation for filtering nodes that represent "prevention methods." In an alternative example of two result operations, the two sequences of operations may be completely independent using different data sources and different levels of details of the search, wherein the first sequence of operations may enable a search in a science domain represented by scientific papers etc. and the second sequence of operations may enable to search newspapers and videos for general information such as statistics about vaccines of "coronavirus."

The set of operations may be executed in operation 205. This may result in intermediate result vectors of nodes and at least one result vector of nodes. The at least one result vector of nodes is associated with a result set of one or more object units of the digital objects. In case the set of operations comprises multiple sequences of operations, the execution of the set of operations may result in multiple result vectors of nodes respectively. The nodes of the multiple result vectors may represent the result set of object units.

Following the first workflow example, intermediate operations $OP_1, OP_2, \ldots, OP_{N-1}$ may result in intermediate result vectors respectively, while the result operation $OP_N$ may result in a result vector. Following the "coronavirus" example, the set of operations may result in a result set of object units such as paragraphs of scientific articles. The result vector of the set of operations may comprise nodes that represent these paragraphs. The intermediate result vector of the filtering operation may comprise nodes that, for example, represent instances of the entity vaccine and other entities related to "vaccines" such as entities representing "doses" etc.

Following the second workflow example, intermediate operations $OP_1^1, OP_2^1 \ldots OP_{N1-1}^1$ may result in intermediate result vectors respectively, intermediate operations $OP_1^2, OP_2^2 \ldots OP_{2-1}^2$ may result in intermediate result vectors respectively while the result operations $OP_{N1}^1$ and $OP_{N2}^2$ may result in two result vectors respectively. Following the "coronavirus" example, the two sequences of operations may result in object units such as paragraphs of scientific articles, sequences of videoframes and passages of newspapers. The two result vectors of the two sequences of operations may comprise nodes that represent these paragraphs, sequences of videoframes and passages.

The result set of object units of the digital objects may be retrieved or fetched in operation 207 e.g., from the second storage device 103. For example, all paragraphs and video frames that have been found relevant for the "coronavirus" search term may be retrieved from their persistent storage. Alternatively, the user may select among the result set of object units the desired object units. In this case, only those selected object units may be retrieved from the persistent storage. However, those retrieved object units may comprise a huge amount of text of information that the user may not all need. For example, paragraphs may include texts about viruses in general that may not be relevant for the user. To solve this, operations 209 to 213 may be performed.

Intermediate result vectors of the intermediate result vectors may be selected in operation 209. This selection may, for example, be performed based on the type of operations that are involved in the set of operations. The selection of the intermediate result vectors may be performed by selecting the associated intermediate result operations. That is, the selection of the intermediate operations implicitly involves the selection of the intermediate result vectors that resulted from said selected intermediate operations. This selection may enable to identify parts of the object units (e.g., document units) that may be relevant for the user.

Following the first workflow example, the selected intermediate result vector may be a result vector of any one of the intermediate operations intermediate operations $OP_1$, $OP_2$ . . . , $OP_{N-1}$. In another example, the selected intermediate result vector may be a result vector of the intermediate operation $OP_{N-1}$ that precedes the result operation $OP_N$. Following the example of "vaccines for coronavirus" search term, the user may only be interested in the intermediate result vector of the filter operation that filters nodes that represent "vaccines" related nodes.

A set of result entities may be identified in operation 211. The set of result entities may be entities which are part of the retrieved object units and part of entities represented by nodes of said selected intermediate result vectors. For example, the identifiers of entities present in the retrieved objects units may be compared with identifiers of entities represented by nodes of the selected intermediate result vectors. This comparison may comprise performing an intersection between the compared identifiers to find the identifiers that are common between the retrieved object units and the selected intermediate result vectors. Following the "coronavirus" example, and if the intermediate result vector of the filtering operation is selected, the identifiers of the entities representing vaccines may be compared with identifiers of entities present in the result set of object units.

The set of result entities of the result set of object units and the result set of object units may be provided in operation 213 because of the search request. Following the "coronavirus" example, the paragraphs of the scientific papers may be displayed, wherein the set of result entities such as "vaccines" etc. are highlighted.

Figure 3:
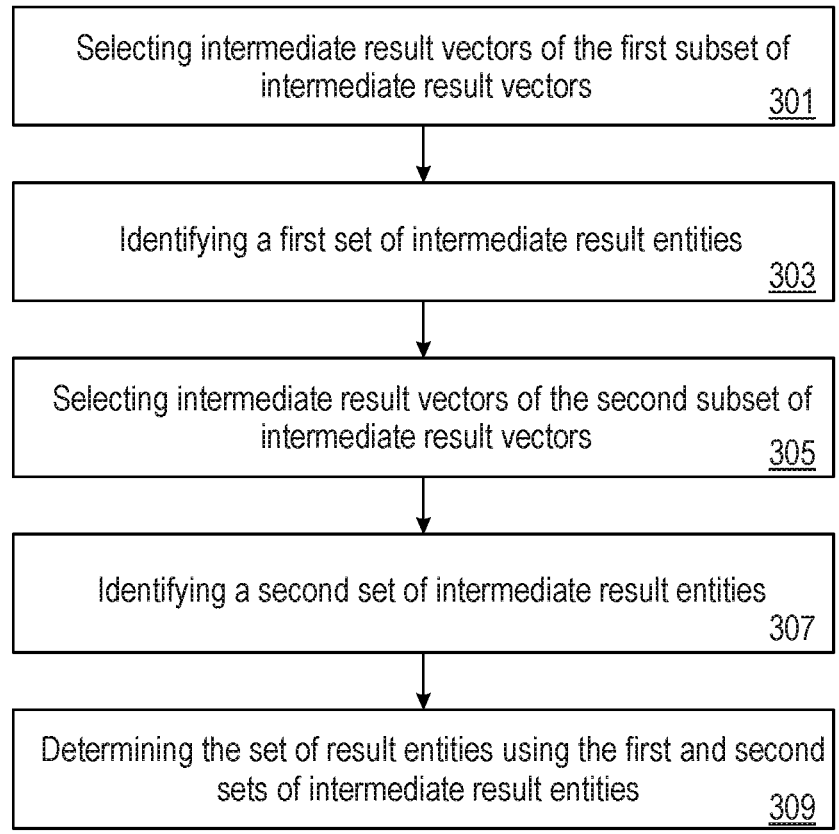
FIG. 3 is a flowchart of a method for identifying a set of result entities in accordance with certain embodiments.

FIG. 3 is a flowchart of a method for identifying a set of result entities in accordance with certain embodiments. For the purpose of explanation, the method described in FIG. 3 may be implemented in the system illustrated in FIG. 1, but it is not limited to this implementation. The method of FIG. 3 may, for example, be performed by the server 106. The method of FIG. 3 provides an example implementation of operations 209 to 213, in case the set of operations comprises two subsets of operations e.g., in accordance with the first workflow example, $OP_1$, $OP_3$ . . . $OP_{N-1}$ and $OP_2$, $OP_4$ . . . $OP_{N-2}$, wherein the result operation $OP_N$ receives as input the intermediate result vectors of the intermediate operations $OP_{N-1}$ and $OP_{N-2}$. In this example, the intermediate operations $OP_{N-1}$ and $OP_{N-2}$ may result in intermediate result vectors which comprise nodes that represent object units e.g., they represent paragraphs or frames stored in the second storage device 103.

Intermediate result vectors (excluding the intermediate result vector of operation $OP_{N-1}$) of the first subset of operations $OP_1$, $OP_3$ . . . $OP_{N-1}$ may be selected in operation 301. A first set of intermediate result entities may be identified in operation 303. The first set of intermediate result entities may be entities which are part of the retrieved object units (which are the result of result operation $OP_N$) and part of entities represented by nodes of said selected intermediate result vectors of the first subset.

Intermediate result vectors (excluding the intermediate result vector of operation $OP_{N-2}$) of the second subset of operations $OP_2$, $OP_4$ . . . $OP_{N-2}$ may be selected in operation 305. A second set of intermediate result entities may be identified in operation 307. The second set of intermediate result entities may be entities which are part of the retrieved object units (which are the result of result operation $OP_N$) and part of entities represented by nodes of said selected intermediate result vectors of the second subset.

The set of result entities identified in operation 211 may be obtained in operation 309 as a combination of the two sets of intermediate result entities. The combination may, for example, be an intersection or union operation between the identifiers of the two sets of intermediate result entities. Although described as second last operations, the intersections may in another example occur in any position within the workflow (e.g., in the middle of the workflow).

Figure 4:
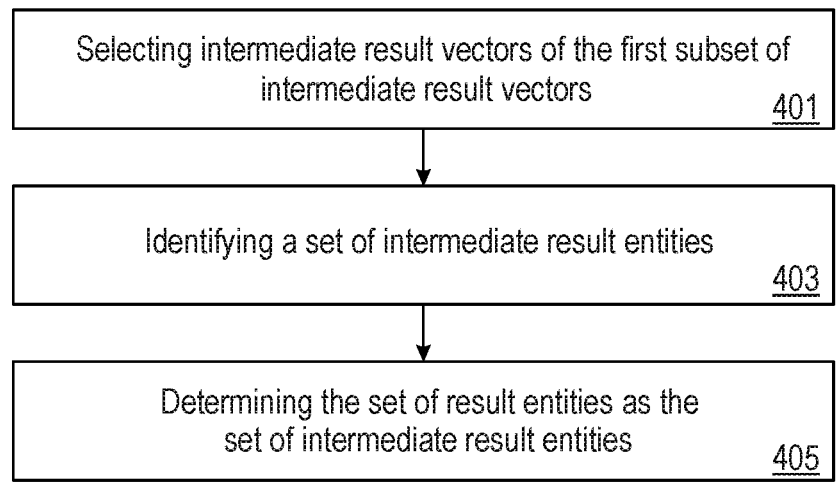
FIG. 4 is a flowchart of a method for identifying a set of result entities in accordance with certain embodiments.

FIG. 4 is a flowchart of a method for identifying a set of result entities in accordance with certain embodiments. For the purpose of explanation, the method described in FIG. 4 may be implemented in the system illustrated in FIG. 1, but is not limited to this implementation. The method of FIG. 4 may, for example, be performed by the server 106. The method of FIG. 4 provides an example implementation of operations 209 to 213, in case the set of operations comprises one sequence of operations e.g., in accordance with the first workflow example, $OP_1$, $OP_2$ . . . $OP_N$, wherein the intermediate operation $OP_{N-1}$ provides an intermediate result vector that comprises nodes representing object units e.g., they represent paragraphs or frames stored in the second storage device 103.

Intermediate result vectors (excluding the intermediate result vector of operation $OP_{N-1}$) of the set of operations $OP_1$, $OP_2$ . . . $OP_N$ may be selected in operation 401. A set of intermediate result entities may be identified in operation 403. The set of intermediate result entities may be entities which are part of the retrieved object units (which are the result of result operation $OP_N$) and part of entities represented by nodes of said selected intermediate result vectors. The set of result entities identified of operation 211 may be provided in operation 405 as the set of intermediate result entities identified in operation 403.

Figure 5A:
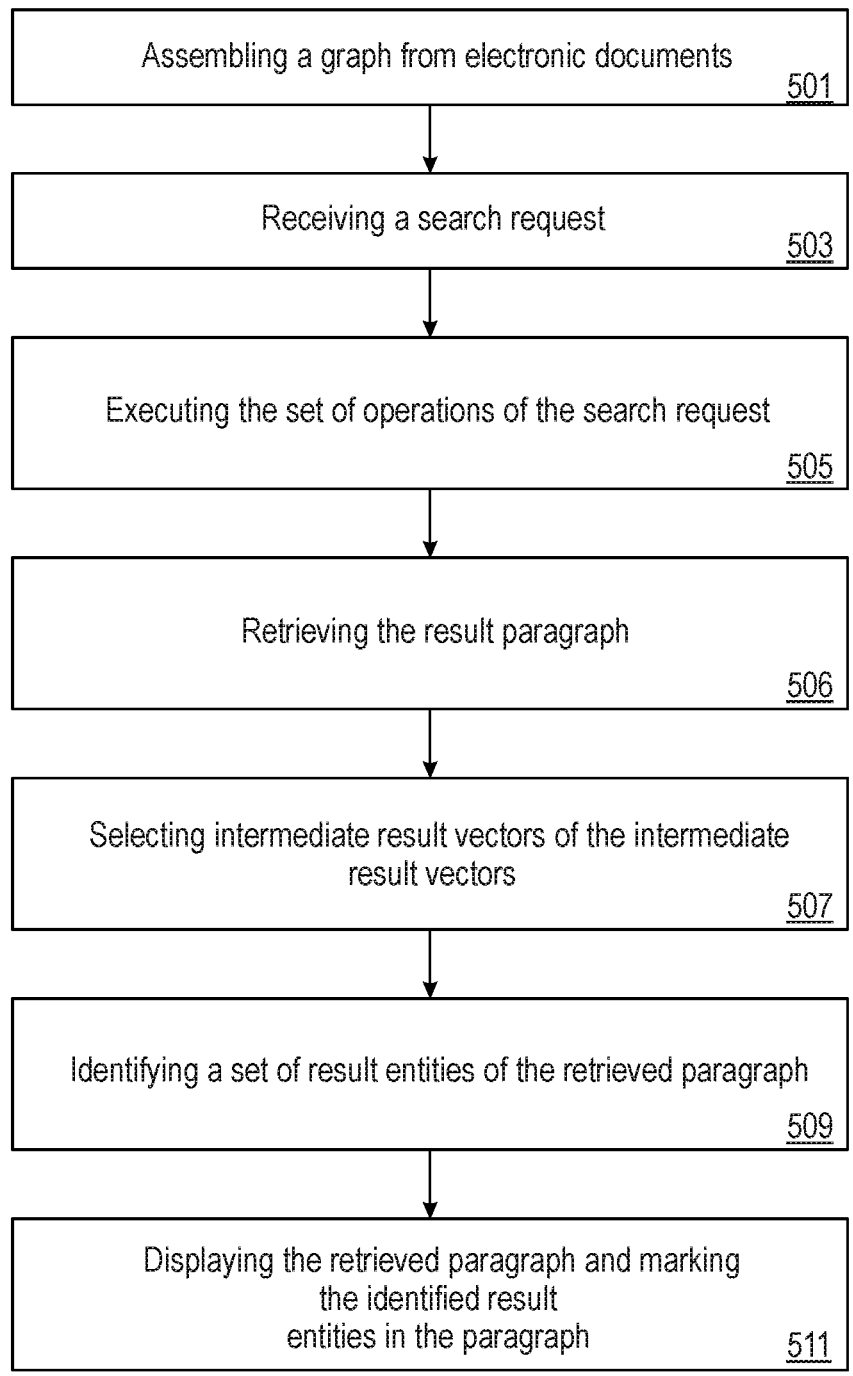
FIG. 5A is a flowchart of a method for searching a graph representing content of digital objects in accordance with certain embodiments.

FIG. 5A is a flowchart of a method for searching a graph representing content of electronic documents in accordance with certain embodiments. The graph may, for example, be built based on the ontology defined in FIG. 5B. FIG. 5B shows an example of an ontology 510 descriptive of relations between companies. The ontology 510 includes concepts and roles. The concepts and roles can be expressed in various ways. FIG. 5B illustrates the concepts and roles in a graph form. For the purpose of explanation, the method described in FIG. 5A may be implemented in the system illustrated in FIG. 1, but it is not limited to this implementation. The method of FIG. 5A may, for example, be performed by the server 106.

The graph may be assembled or built, in operation 501. The ontology 510 may be used to create the graph. For that, data about companies may be collected. The collected data may comprise, for example, existing electronic documents. With this collected data, as well as the ontology 510, specific instances of the terms of the ontology 510 may be created and values of the properties of the terms may be determined, resulting in the graph. For example, entities such as company names, their business area, and paragraphs present in the electronic documents may be identified to build the graph accordingly. The graph may comprise nodes representing entities and edges representing relationships between the entities. FIG. 5C shows an example paragraph 520 that is represented by a node in the graph. Example entities present in the paragraph 520 are stored in a JSON file 530 shown in FIG. 5D. The JSON file 530, lists the entities and associated identifiers. For example, the entity "ABC" is associated with the identifier 12345abc.

Figure 5E:
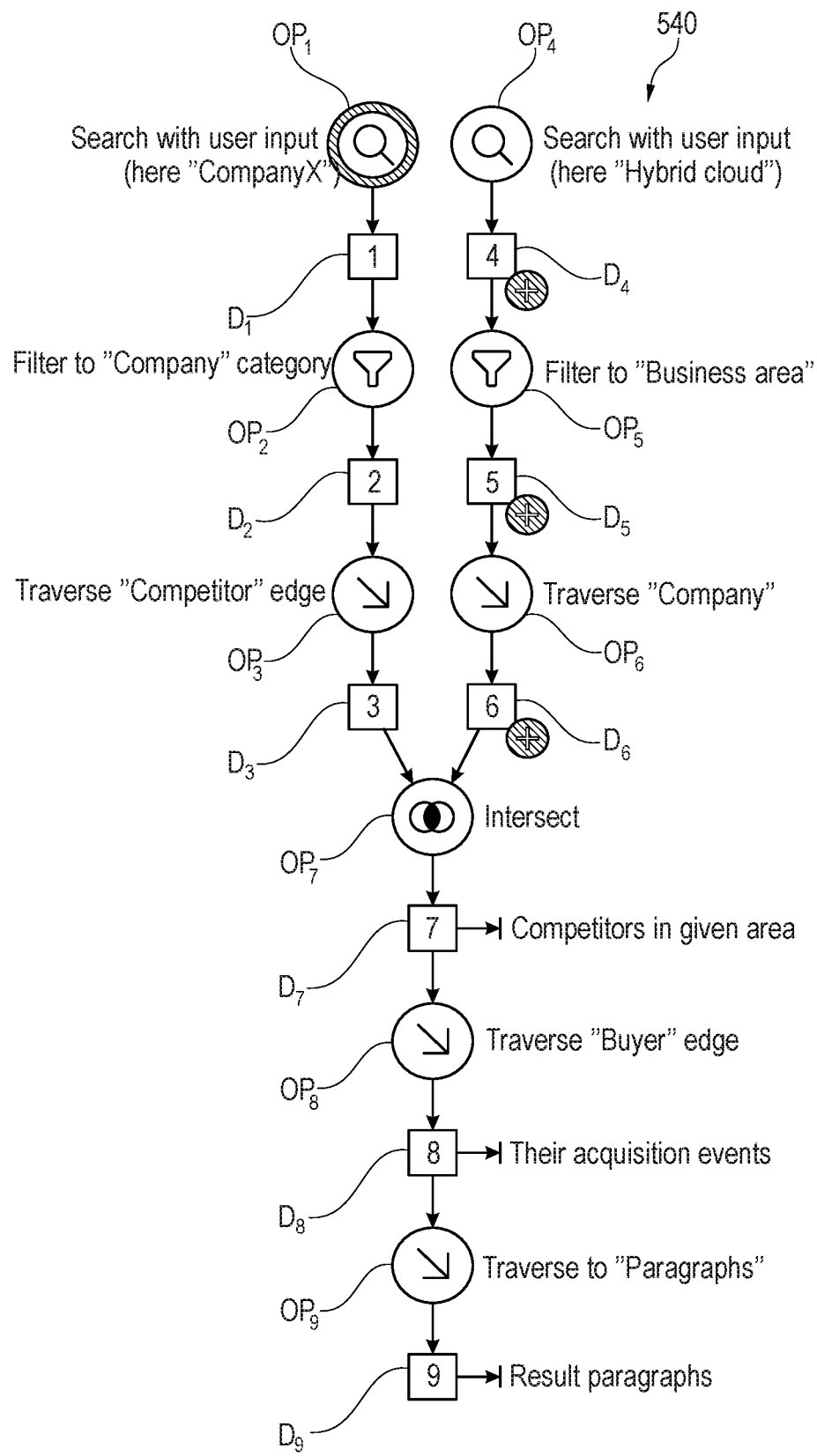
FIG. 5E depicts an example workflow in accordance with certain embodiments.

A search request may be received in operation 503. As indicated in FIG. 5E, the search request may, for example, specify user inputs "IBM" and "Hybrid cloud" and a workflow 540 of operations. The workflow 540 comprises a set of operations $OP_1$, $OP_2$ $OP_9$. The set of operations comprises a first subset of operations $OP_1$, $OP_2$ and $OP_3$ and an independent second subset of operations $OP_4$, $OP_5$ and $OP_6$. The set of operations comprises a result operation $OP_9$. Each of the intermediate operations $OP_1$, $OP_2$ . . . $OP_8$ provides, when executed, a respective intermediate result vector $D_1$, $D_2$ . . . $D_8$. The intermediate result vectors $D_3$ and $D_6$ may be provided as input to the intermediate operation $OP_7$ that performs an intersection of the intermediate result vectors $D_3$ and $D_6$ to obtain the intermediate result vector $D_7$. The result operation $OP_9$ provides, when executed, a result vector $D_9$. The result vector comprises nodes such as instances of the node named "Paragraph" in the graph. Assuming for simplification of the description, that the result vector $D_9$ comprises one node that represents the paragraph 520 of FIG. 5C.

The set of operations $OP_1$, $OP_2$ . . . $OP_9$ may be executed in operation 505. This may result in nine vectors $D_1$, $D_2$ . . . and $D_9$. The paragraph 520 may be retrieved in operation 506 from the second storage device 103.

One or more intermediate result vectors may be selected in operation 507 from the intermediate result vectors $D_1$, $D_2$ . . . $D_8$. Assuming for simplification of the description that the intermediate result vectors $D_7$ and $D_8$ have been selected in operation 507.

The set of result entities may be identified in operation 509. This is illustrated in FIG. 5F, where the identifiers of the JSON file 530 associated with the paragraph 520 are compared with the identifiers of the selected intermediate result vector $D_7$. The same comparison may be performed between the identifiers of the JSON file 530 and the identifiers of the selected result vector $D_8$. The set of result entities may be entities which are present in both the JSON file and in the entities of the intermediate result vector $D_7$ or $D_8$.

The result paragraph 520 may be displayed in operation 511, wherein the identified set of result entities are marked in the paragraph. This is indicated with the displayed paragraph 550 of FIG. 5G, where the highlighted entity "ABC" represents an entity of $D_7$ or $D_8$. The marking further indicates result entities from $D_8$. The set of result entities of $D_8$ may represent an acquisition event defined by 4 components, Acquisition term "acquired", Year 2018, Buyer "ABC", Bought "CompanyX".

Figure 6A:
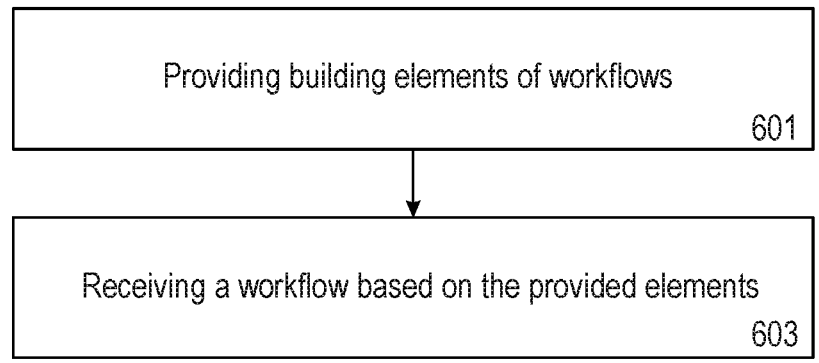
FIG. 6A is a flowchart of a method for determining a search request in accordance with certain embodiments.

FIG. 6A is a flowchart of a method for determining a workflow in accordance with certain embodiments. For the purpose of explanation, the method described in FIG. 6A may be implemented in the information retrieval system 100 illustrated in FIG. 1, but is not limited to this implementation. The method of FIG. 6A may, for example, be performed by the server 106. The method of FIG. 6A may be performed a priori for preparing workflows among which the user may select one that suits his or her search. In another example, the method of FIG. 6A may be performed by the user as part of defining or determining his or her search request.

Figure 6B:
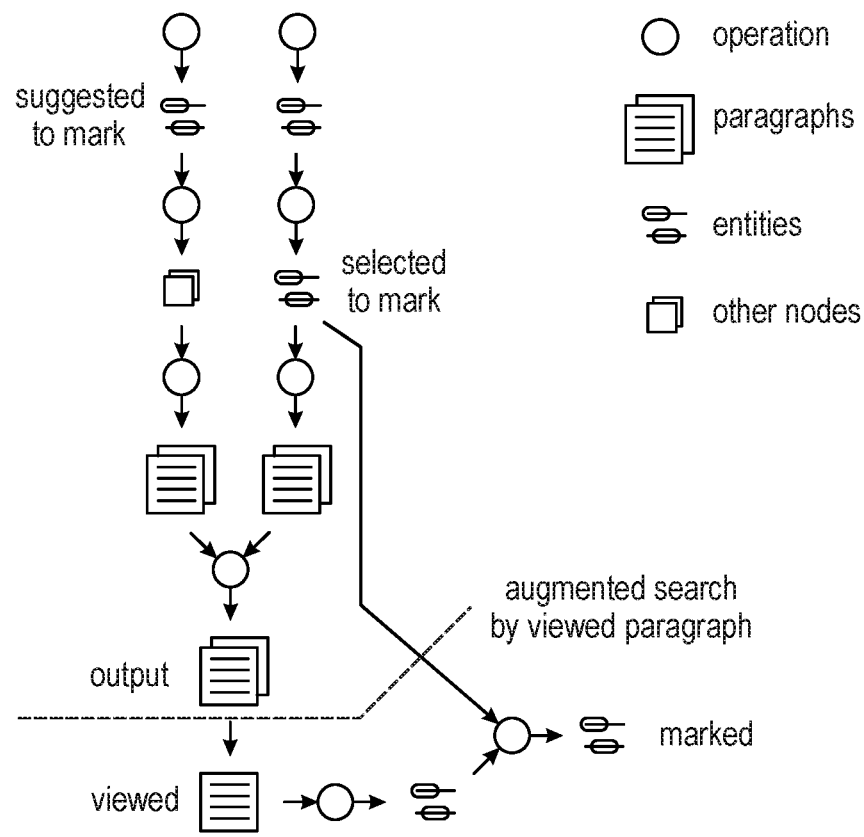
FIG. 6B depicts elements for building workflows in accordance with certain embodiments.

Elements of workflows as shown in FIG. 6B may be provided in operation 601. For example, the workflow elements may be provided as user interface elements that may be displayed on the user interface 108. As shown in FIG. 6B, the elements of the workflows comprise elements that represent different types of operations. The elements of the workflows further comprise elements representing different types of result nodes. For example, a result vector may provide nodes that represent paragraphs or entities or other nodes, wherein the other nodes may represent entities which are not part of the digital objects being processed but may represent a data catalogue.

Figure 6C:
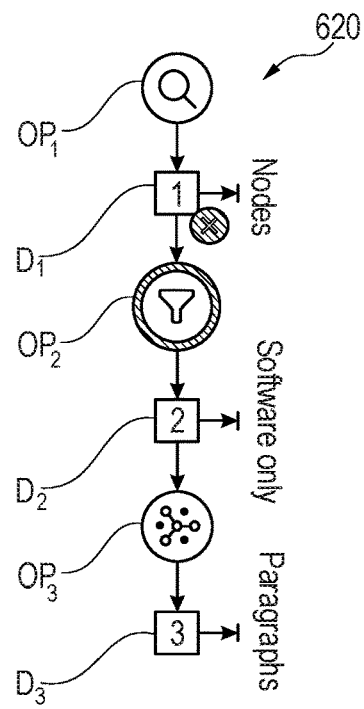
FIG. 6C depicts an example workflow in accordance with certain embodiments.

The user may for example build a workflow such as the workflow 540 of FIG. 5E using the elements of FIG. 6B. The built workflow may be received as a search request in operation 603. FIG. 6C provides an example workflow. The workflow 620 of FIG. 6C comprises a set of operations $OP_1$, $OP_2$ and $OP_3$. The first intermediate operation $OP_1$ may be a node retrieval operation that determines the nodes $D_1$ of the graph that satisfy a user search request. The second intermediate operation $OP_2$ may be a filter operation that selects nodes $D_2$ that belong to a certain category e.g., software category. The result operation $OP_3$ may receive as input the intermediate result vector $D_2$ and provide a result vector $D_3$ that comprise nodes representing paragraphs of electronic documents. The paragraphs may be the result of the user search. In addition, the intermediate result vector $D_2$ may be selected so that entities which are present in the paragraphs and in $D_2$ may be highlighted or marked when the paragraphs are displayed to the user.

Figure 7:
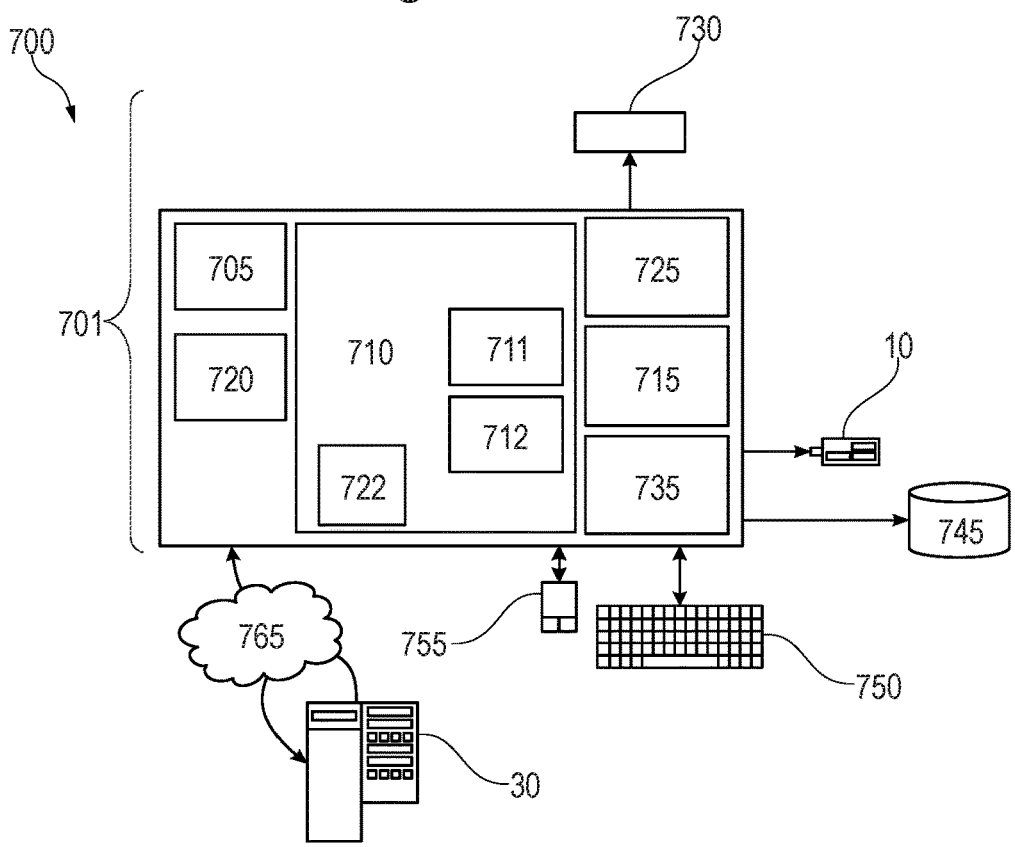
FIG. 7 represents a computerized system, suited for implementing one or more method steps in accordance with certain embodiments.

FIG. 7 represents a general computerized system 700 suited for implementing at least part of method operations as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 712 (including firmware 722), hardware (processor) 705, or a combination thereof. In exemplary embodiments, the methods described herein are implemented in software, as an executable program, and are executed by a special or general-purpose digital computer, such as a personal computer, workstation, minicomputer, or mainframe computer. The most general system 700 therefore includes a general-purpose computer 701.

In exemplary embodiments, in terms of hardware architecture, as shown in FIG. 7, the computer 701 includes a processor 705, memory (main memory) 710 coupled to a memory controller 715, and one or more input and/or output (I/O) devices (or peripherals) 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor-based microprocessor (in the form of a microchip or chip set), or generally any device for executing software instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in certain embodiments. In the example of FIG. 7, software in the memory 710 includes instructions or software 712 e.g., instructions to manage databases such as a database management system.

The software in memory 710 shall also typically include a suitable operating system (OS) 711. The OS 711 essentially controls the execution of other computer programs, such as possibly software 712 for implementing methods as described herein.

The methods described herein may be in the form of a source program, executable program, or software 712 (object code), script, or any other entity comprising a set of instructions to be performed. When a source program, then the program needs to be translated via a compiler, assembler, interpreter, or the like, which may or may not be included within the memory 710, so as to operate properly in connection with the OS 711. Furthermore, the methods can be written as an object-oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client and the like via a broadband connection. The network 765 transmits and receives data between the computer 701 and external systems 30, which can be involved to perform part, or all of the steps/operations of the methods discussed herein. In exemplary embodiments, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) 722. The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 7, the methods can be stored on any computer readable medium, such as storage 720, for use by or in connection with any computer related system or method. The storage 720 may comprise a disk storage such as HDD storage.

The present subject matter may comprise the following clauses.

Clause 1. A computer-implemented method for searching a graph representing content of digital objects, the graph comprising nodes representing entities and edges representing relationships between the entities, the entities being descriptive of the content of the digital objects, the method comprising: receiving a search request; determining a set of operations for traversing the graph according to the search request, wherein each operation of the set of operations receives an input and provides, as output, a vector of nodes; executing the set of operations, resulting in intermediate result vectors of nodes and a result vector of nodes, the result vector of nodes being associated with a result set of one or more object units of the digital objects; retrieving the result set of object units of the digital objects; selecting intermediate result vectors of the intermediate result vectors; identifying a set of result entities as entities which are part of the retrieved object units and part of entities represented by nodes of said selected intermediate result vectors; providing the set of result entities of the result set of object units and the result set of object units as a result of the search request.

Clause 2. The method of clause 1, the digital objects comprising at least one of: electronic documents, video files and images.

Clause 3. The method of any of the preceding clauses 1 to 2, wherein the graph is stored in a first storage device and the digital objects are stored in a second storage device, wherein the first storage device has higher data access performance than the second storage device.

Clause 4. The method of any of the preceding clauses 1 to 3, further comprising selecting the intermediate result vectors based on a selection criterion requiring any one of: a selection based on the type of operations that precedes a result operation that provides the result vector; a random selection of a subset of intermediate result vectors; a selection of intermediate result vectors of operations succeeding an initial operation of the set of operations; a selection of an intermediate result vector of an operation immediately preceding the operation that resulted in the result vector; a user selection of intermediate result vectors.

Clause 5. The method of any of the preceding clauses 1 to 4, wherein the selected intermediate result vectors are all intermediate result vectors.

Clause 6. The method of any of the preceding clauses 1 to 5, wherein the set of operations comprises at least two distinct subsets of operations comprising a first subset of operations and a second subset of operations, wherein the execution of the first and second subsets of operations result respectively in a first intermediate result vector and a second intermediate result vector, the first and second intermediate result vectors being associated respectively with a first set of object units and second set of object units of the digital objects; wherein the result vector is a result of a combination of the first and second intermediate result vectors; the method further comprising: selecting intermediate result vectors of the first subset; identifying a first set of intermediate result entities as entities which are part of the retrieved object units and part of entities represented by nodes of said selected intermediate result vectors of the first subset; selecting intermediate result vectors of the second subset; identifying a second set of intermediate result entities as entities which are part of the retrieved object units and part of entities represented by nodes of said selected intermediate result vectors of the second subset; wherein the set of result entities is a combination of the two sets of intermediate result entities.

Clause 7. The method of clause 6, being performed in response to determining that the first and second sets of objects units comprise the result set of object units.

Clause 8. The method of any of the preceding clauses 1 to 7, wherein the result vector is a result of an operation on one intermediate result vector associated with respective set of object units of the digital objects, the method further comprising: selecting intermediate result vectors that precedes the one intermediate result vector; identifying a set of intermediate result entities as entities which are part of the retrieved object units and part of entities represented by nodes of said selected intermediate result vectors; wherein the set of result entities is the set of intermediate result entities.

Clause 9. The method of any of the preceding clauses 1 to 8, wherein the result vector comprises: nodes representing the result set of object units.

Clause 10. The method of any of the preceding clauses 1 to 9, further comprising: associating each node of the graph with an identifier for identifying the entity represented by said each node; wherein the identifying of the set of result entities comprises: comparing the identifiers of entities of the object units with the identifiers of nodes of the selected intermediate result vectors; wherein the set of result entities are the matching entities.

Clause 11. The method of any of the preceding clauses 1 to 10, further comprising upon receiving the search request, selecting one of predefined search workflows, wherein the determined set of operations are operations of the selected search workflow.

Clause 12. The method of any of the preceding clauses 1 to 11, wherein the set of operations comprises a node retrieval operation and at least one traversal operation, wherein the node retrieval operation receives the search request as input and provides an initial vector of nodes that fulfils the search request, wherein the traversal operation provides a result vector of nodes that fulfil a traversal condition and are reachable after one step traversal starting from an input vector, wherein the input vector is the initial vector of nodes in case the node retrieval operation is the operation immediately preceding the traversal operation, otherwise the input vector is an intermediate result vector of another immediately preceding operation.

Clause 13. The method of clause 12, the set of operations further comprising logical operations and transformation operations.

Clause 14. The method of any of the preceding clauses 1 to 13, wherein providing the set of result entities and the one or more object units comprises displaying the object units and highlighting the set of result entities.

Clause 15. The method of any of the preceding clauses 1 to 14, the object unit being any one of: a paragraph, section or chapter, a sequence of video frame, image portion.

Clause 16. The method of any of the preceding clauses 1 to 15, wherein the entity is a word or combination of words of a digital object or an object that can be represented in an image or video.

It is to be understood that although this disclosure includes a detailed description on cloud computing, implementation of the teachings recited herein are not limited to a cloud computing environment. Rather, the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
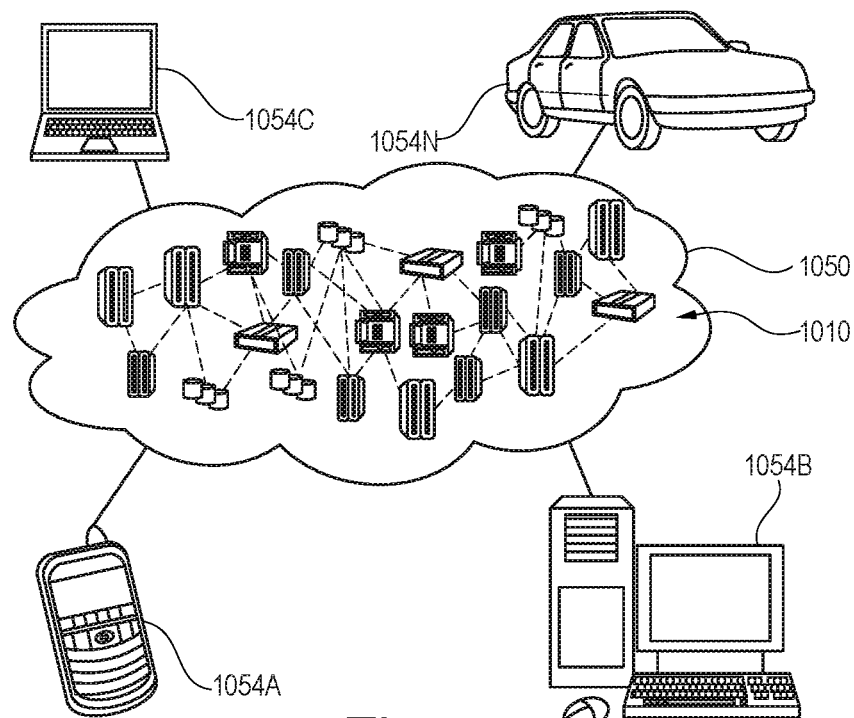
FIG. 8 depicts a cloud computing environment according to certain embodiments.

Referring now to FIG. 8, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
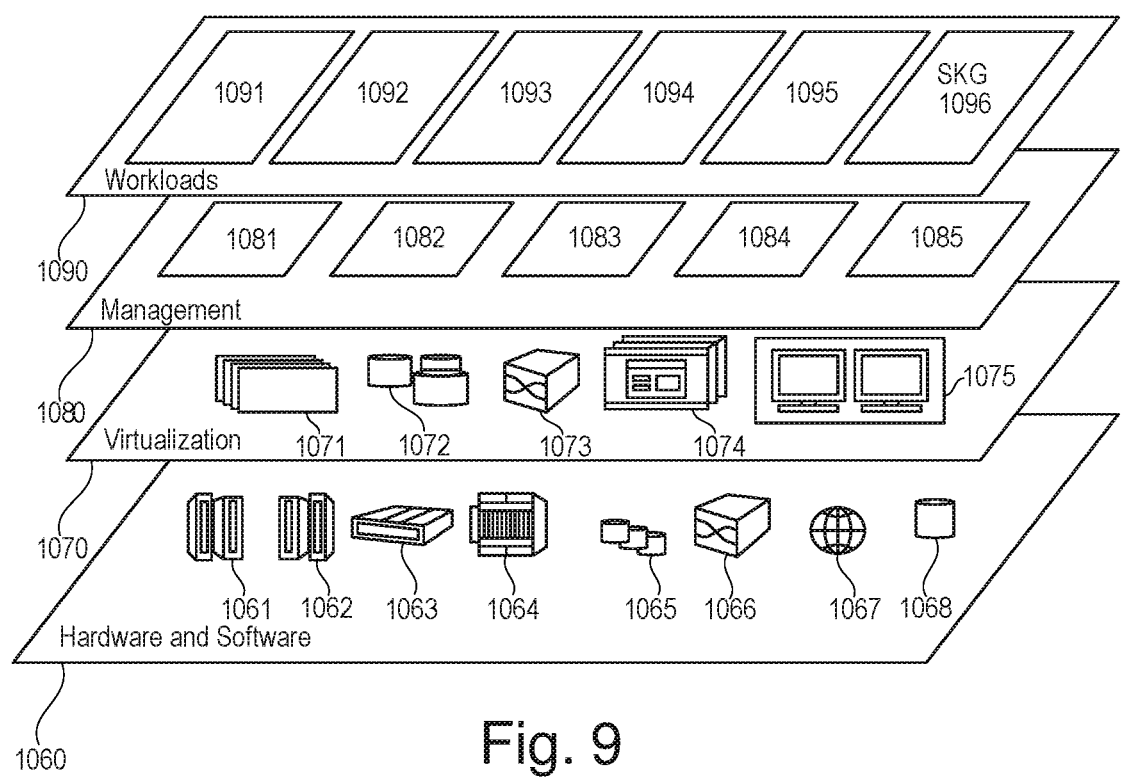
FIG. 9 depicts abstraction model layers according to certain embodiments.

Referring now to FIG. 9, a set of functional abstraction layers provided by cloud computing environment 1050 (FIG. 8) is shown. It should be understood in advance that the components, layers, and functions shown in FIG. 9 are intended to be illustrative only and embodiments are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized.

Examples of workloads and functions which may be provided from this layer include: mapping and navigation 1091; software development and lifecycle management 1092; virtual classroom education delivery 1093; data analytics processing 1094; transaction processing 1095; and searching knowledge graphs (SKG) 1096 in accordance with the present subject matter e.g., as described with reference to FIG. 2, 3, 4, 5A or 6A.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a search request for searching a graph representing content of digital objects, the graph comprising nodes representing entities and edges representing relationships between the entities, the entities being descriptive of the content of the digital objects;
    determining a set of operations for traversing the graph according to the search request, wherein each operation of the set of operations receives an input and provides, as output, a vector of nodes;
    executing a set of intermediate operations resulting in intermediate vectors of nodes that represent intermediate object units that are portions of the digital objects, and identifying intermediate entities in the intermediate object units;
    after executing the intermediate operations, executing a result operation resulting in a result vector of the nodes that represent result object units, and identifying result entities in the result object units;
    for at least one of the intermediate operations, comparing the intermediate entities of the intermediate object units with the result entities of the result object units to find an intersection of common entities that are present in both the intermediate object units and the result object units;
    highlighting the common entities in the result object units; and
    displaying the result object units with the highlighted common entities,
    wherein the set of operations comprises a node retrieval operation and at least one traversal operation, wherein the node retrieval operation receives the search request as the input and provides an initial vector of nodes that fulfils the search request,
    wherein the traversal operation provides a result vector of nodes that fulfil a traversal condition and are reachable after one step traversal starting from an input vector, and
    wherein the input vector is the initial vector of nodes in case the node retrieval operation is an operation immediately preceding the traversal operation, otherwise the input vector is an intermediate result vector of another immediately preceding operation.

2. The method of claim 1, the digital objects comprising at least one of: electronic documents, video files and images.

3. The method of claim 1, wherein the graph is stored in a first storage device and the digital objects are stored in a second storage device, wherein the first storage device has higher data access performance than the second storage device.

4. The method of claim 1, further comprising selecting the intermediate result vectors based on a selection criterion requiring any one of:
    a selection based on a type of operations that precede a result operation that provides the result vector;
    a random selection of a subset of intermediate result vectors;
    a selection of intermediate result vectors of operations succeeding an initial operation of the set of operations;
    a selection of an intermediate result vector of an operation immediately preceding the operation that resulted in the result vector;
    a user selection of intermediate result vectors.

5. The method of claim 1, wherein the selected at least one of the intermediate result vectors are all intermediate result vectors.

6. The method of claim 1, wherein the set of operations comprises at least two distinct subsets of operations comprising a first subset of operations and a second subset of operations, wherein the execution of the first and second subsets of operations result respectively in a first intermediate result vector and a second intermediate result vector, the first and second intermediate result vectors being associated respectively with a first set of object units and second set of object units of the digital objects; wherein the result vector is a result of a combination of the first and second intermediate result vectors; the method further comprising:
    selecting intermediate result vectors of the first subset;
    identifying a first set of intermediate result entities as entities which are part of the retrieved object units and part of entities represented by nodes of said selected intermediate result vectors of the first subset;
    selecting intermediate result vectors of the second subset;
    identifying a second set of intermediate result entities as entities which are part of the retrieved object units and part of entities represented by nodes of said selected intermediate result vectors of the second subset;
    wherein the set of result entities is a combination of two sets of intermediate result entities.

7. The method of claim 6, being performed in response to determining that the first set of objects and the second set of objects units comprise the result set of object units.

8. The method of claim 1, wherein the result vector is a result of an operation on one intermediate result vector associated with respective set of object units of the digital objects, the method further comprising:
    selecting intermediate result vectors that precedes the one intermediate result vector;
    identifying a set of intermediate result entities as entities which are part of the retrieved object units and part of entities represented by the nodes of said selected intermediate result vectors;
    wherein the set of result entities is the set of intermediate result entities.

9. The method of claim 1, wherein the result vector comprises: nodes representing the result set of object units.

10. The method of claim 1, further comprising:
associating each node of the graph with an identifier for identifying the entity represented by said each node;
wherein the identifying of the set of result entities comprises: comparing the identifiers of entities of the object units with the identifiers of nodes of the selected intermediate result vectors; wherein the set of result entities are the matching entities.

11. The method of claim 1, further comprising upon receiving the search request, selecting one of predefined search workflows, wherein the determined set of operations are operations of the selected search workflow.

12. The method of claim 1, the object unit being any one of: a paragraph, section or chapter, a sequence of video frame, image portion.

13. The method of claim 1, wherein the entity is a word or combination of words of a digital object or an object that can be represented in an image or video.

14. A computer program product comprising one or more computer readable storage media, and program instructions collectively stored on the one or more computer readable storage media, the program instructions executable by one or more processors to cause the one or more processors to perform actions comprising:
receiving a search request for searching a graph representing content of digital objects, the graph comprising nodes representing entities and edges representing relationships between the entities, the entities being descriptive of the content of the digital object;
determining a set of operations for traversing the graph according to the search request, wherein each operation of the set of operations receives an input and provides, as output, a vector of nodes;
executing a set of intermediate operations resulting in intermediate vectors of nodes that represent intermediate object units that are portions of the digital objects, and identifying intermediate entities in the intermediate object units;
after executing the intermediate operations, executing a result operation resulting in a result vector of the nodes that represent result object units, and identifying result entities in the result object units;
for at least one of the intermediate operations, comparing the intermediate entities of the intermediate object units with the result entities of the result object units to find an intersection of common entities that are present in both the intermediate object units and the result object units;
highlighting the common entities in the result object units; and
displaying the result object units with the highlighted common entities,
wherein the set of operations comprises a node retrieval operation and at least one traversal operation, wherein the node retrieval operation receives the search request as the input and provides an initial vector of nodes that fulfils the search request,
wherein the traversal operation provides a result vector of nodes that fulfil a traversal condition and are reachable after one step traversal starting from an input vector, and
wherein the input vector is the initial vector of nodes in case the node retrieval operation is an operation immediately preceding the traversal operation, otherwise the input vector is an intermediate result vector of another immediately preceding operation.

15. The computer program product of claim 14, wherein the computer-readable program code is provided as a service in a cloud environment.

16. A system comprising:
one or more computer readable storage media with program instructions collectively stored on the one or more computer readable storage media; and
one or more processors configured to execute the program instructions to perform a method comprising:
receiving a search request for searching a graph representing content of digital objects, the graph comprising nodes representing entities and edges representing relationships between the entities, the entities being descriptive of the content of the digital objects;
determining a set of operations for traversing the graph according to the search request, wherein each operation of the set of operations receives an input and provides, as output, a vector of nodes;
executing a set of intermediate operations resulting in intermediate vectors of nodes that represent intermediate object units that are portions of the digital objects, and identifying intermediate entities in the intermediate object units;
after executing the intermediate operations, executing a result operation resulting in a result vector of the nodes that represent result object units, and identifying result entities in the result object units;
for at least one of the intermediate operations, comparing the intermediate entities of the intermediate object units with the result entities of the result object units to find an intersection of common entities that are present in both the intermediate object units and the result object units;
highlighting the common entities in the result object units; and
displaying the result object units with the highlighted common entities,
wherein the set of operations comprises a node retrieval operation and at least one traversal operation, wherein the node retrieval operation receives the search request as the input and provides an initial vector of nodes that fulfils the search request,
wherein the traversal operation provides a result vector of nodes that fulfil a traversal condition and are reachable after one step traversal starting from an input vector, and
wherein the input vector is the initial vector of nodes in case the node retrieval operation is an operation immediately preceding the traversal operation, otherwise the input vector is an intermediate result vector of another immediately preceding operation.

* * * * *